United States Patent [19]

Horner et al.

[11] Patent Number: 4,465,332
[45] Date of Patent: Aug. 14, 1984

[54] HOLOGRAPHIC DIRECTIONAL COUPLER FOR FIBER OPTIC SYSTEMS

[75] Inventors: Joseph L. Horner, Cambridge; Jacques E. Ludman, Westford, both of Mass.

[73] Assignee: The United States of America as represented by the Secretary of the Air Force, Washington, D.C.

[21] Appl. No.: 375,622

[22] Filed: May 6, 1982

[51] Int. Cl.³ ............................................. G02B 5/32
[52] U.S. Cl. ................................. 350/96.19; 350/3.7; 350/96.20
[58] Field of Search ............... 350/96.18, 96.19, 96.20, 350/3.7, 3.72, 3.85

[56] References Cited

U.S. PATENT DOCUMENTS

| | | | |
|---|---|---|---|
| 3,506,327 | 4/1970 | Leith et al. | 350/3.5 |
| 3,666,345 | 5/1972 | Maslowski | 350/3.5 |
| 3,864,016 | 2/1975 | Dakss et al. | 350/96 WG |
| 3,885,856 | 5/1975 | Ostrowsky et al. | 350/3.5 |
| 4,054,356 | 10/1977 | Noguchi | 350/3.5 |
| 4,245,884 | 1/1981 | Magura et al. | 350/96.16 |
| 4,310,216 | 1/1982 | Pellaux | 350/96.18 X |
| 4,337,993 | 7/1982 | Kompfner | 350/96.19 |
| 4,387,955 | 6/1983 | Ludman et al. | 350/96.19 |
| 4,392,709 | 7/1983 | Horner et al. | 350/96.19 X |
| 4,398,792 | 8/1983 | Horner et al. | 350/96.19 |

OTHER PUBLICATIONS

Nishihara, H. et al., "Holocoupler: A Novel Coupler for Optical Circuits", *IEEE Journal of Quantum Electronics*, Sep. 1975, pp. 794–796.

Thyagarajan, K. et al., "Efficient Coupling of Incoherent Light into Optical Fibers and Bundles," Applied Optics, vol. 17, No. 15, Aug. 1, 1978, pp. 2416–2419.

Kogelnik, H. et al., "Holographic Thin Film Couplers", *The Bell System Technical Journal*, vol. 49, No. 7, Sep. 1970, pp. 1602–1603.

Horner, J. et al., "Holographic Optical Element (HOE) for Demultiplexing in Fiber Optic Systems", *SPIE*, vol. 215, Recent Advances in Holography, May 14, 1980.

*Primary Examiner*—John D. Lee
*Assistant Examiner*—Akm E. Ullah
*Attorney, Agent, or Firm*—Donald J. Singer; Jacob N. Erlich

[57] ABSTRACT

A fiber optic directional coupler having a holographic element incorported therein. A single optical signal impinges on the holographic element and is separated into a plurality of individual signals which are coupled to a plurality of individual optical fibers. Only a fraction of the incident electromagnetic radiation incident on the holographic element is transmitted to any one of the plurality of fibers. Reversing the direction of the radiation causes all the energy emanating from the combined plurality of fibers to be coupled to the single receiving fiber.

8 Claims, 5 Drawing Figures

HOLOGRAPHIC DIRECTIONAL COUPLER FOR FIBER OPTIC SYSTEMS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a directional coupling system, and, more particularly, to a directional coupler which incorporates therein a holographic element.

The need frequently arises for communications or data transmission systems to convey a message from an information source (master) in one location to a multiple number of users at another location. In addition, such a system must be capable of sending information back to the master source, while at the same time preventing any of the users from intercepting data from any of the other multiple users. The directional coupler allows all of the energy in the optical signal from any one of the users to be transmitted back to the master source with 100% efficiency, but allows only a controlled amount of the energy from the master source to be transmitted to any one user; hence the name directional coupler.

In recent years with the development and implementation of fiber optic technology into practical communication systems, a great deal of attention has been given to the coupling and distribution of fiber optic signals. Size and fabrication expense are critical factors when providing coupling devices. To date, however, directional couplers have been either unreliable in complete separation of the individual signals, or are of such a size and cost so as to provide an overall system which is incompatible with the required small size and economic requirements. Consequently, a need arises for a small, lightweight, inexpensive directional coupler which can be effectively used as a directional coupling device in a fiber optic system.

SUMMARY OF THE INVENTION

The instant invention overcomes the problems encountered in the past by providing a directional coupler made up of a single holographic component encased in a uniquely designed housing and is therefore small, lightweight, and inexpensive to produce. In addition, the holographic directional coupler of this invention can be made to operate directly with the diverging output of an optical fiber, performing the functions of collimating and refocusing in a single element.

The coupling device of this invention incorporates therein a holographic element capable of operating in either transmission or reflection. This element is made by a holographic technique utilizing a photosensitive medium having sufficient thickness so as to achieve a high diffraction efficiency as well as a broad bandwidth of operation. In addition, the photosensitive medium must be capable of high resolution in order to record the high density of optical fringes necessary for practical operation.

In fabricating the transmissive directional coupler of this invention, a plurality of temporally and spatially coherent beams of electromagnetic radiation, derived from a common source, form a plurality of separate paths of substantially identical length. One group of beams (one converging beam for each user channel desired) are focused by conventional focusing apparatus through the photosensitive medium to a point located behind the photosensitive medium. The other beam (a single diverging beam) emerges from an optical fiber or the like acting as point source and impinges upon the side of the photosensitive medium opposite the focus point of the coverging beams.

In fabricating the reflective version of this invention the diverging beam impinges upon the same side of the photosensitive medium as the focus point of the converging beams. This is accomplished by appropriate beam steering means which direct the diverging beam into the same side of the photosensitive medium as the focal points of the converging beams. The above procedures for producing both the transmissive and reflective directional coupler of this invention corresponds to the making of a hologram of a virtual point source. Thereafter, the photosensitive medium is developed by methods appropriate to the photosensitive medium in order to produce the holographic element.

In either of the above cases, the holographic element is encased within a uniquely designed housing. The housing is capable of aligning a single input/output fiber with a plurality of other fibers. Used as a directional coupler, an electromagnetic signal or beam representing the information from the master channel is introduced into the holographic element from a point source, such as an optical fiber, having the same relative position with respect to the holographic element as the point source had to the photosensitive medium during the production of the holographic element. Within the holographic element of the directional coupler of this invention, the individual user channels are angularly separated, and directed each to a position in space where one of the focused beams was directed during fabrication of the holographic element. The spatially separated channels can be launched at these positions onto or into a series of appropriately aligned optical fibers. When the system operates in reverse, data in the form of an optical beam emerges from any of the user channels, impinges on the holographic element of this invention and is focused back to the master channel fiber with near 100% efficiency.

It is therefore an object of this invention to provide a directional coupling device which incorporates therein a single optical component in the form of a holographic element.

It is another object of this invention to provide a directional coupling device which is small, lightweight and extremely efficient in operation.

It is a further object of this invention to provide a directional coupling device which is capable of operating with the diverging output of an optical fiber.

It is still another object of this invention to provide a directional coupling device whose properties in manufacturing are extremely uniform from device to device.

It is still another object of this invention to provide a directional coupling device which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
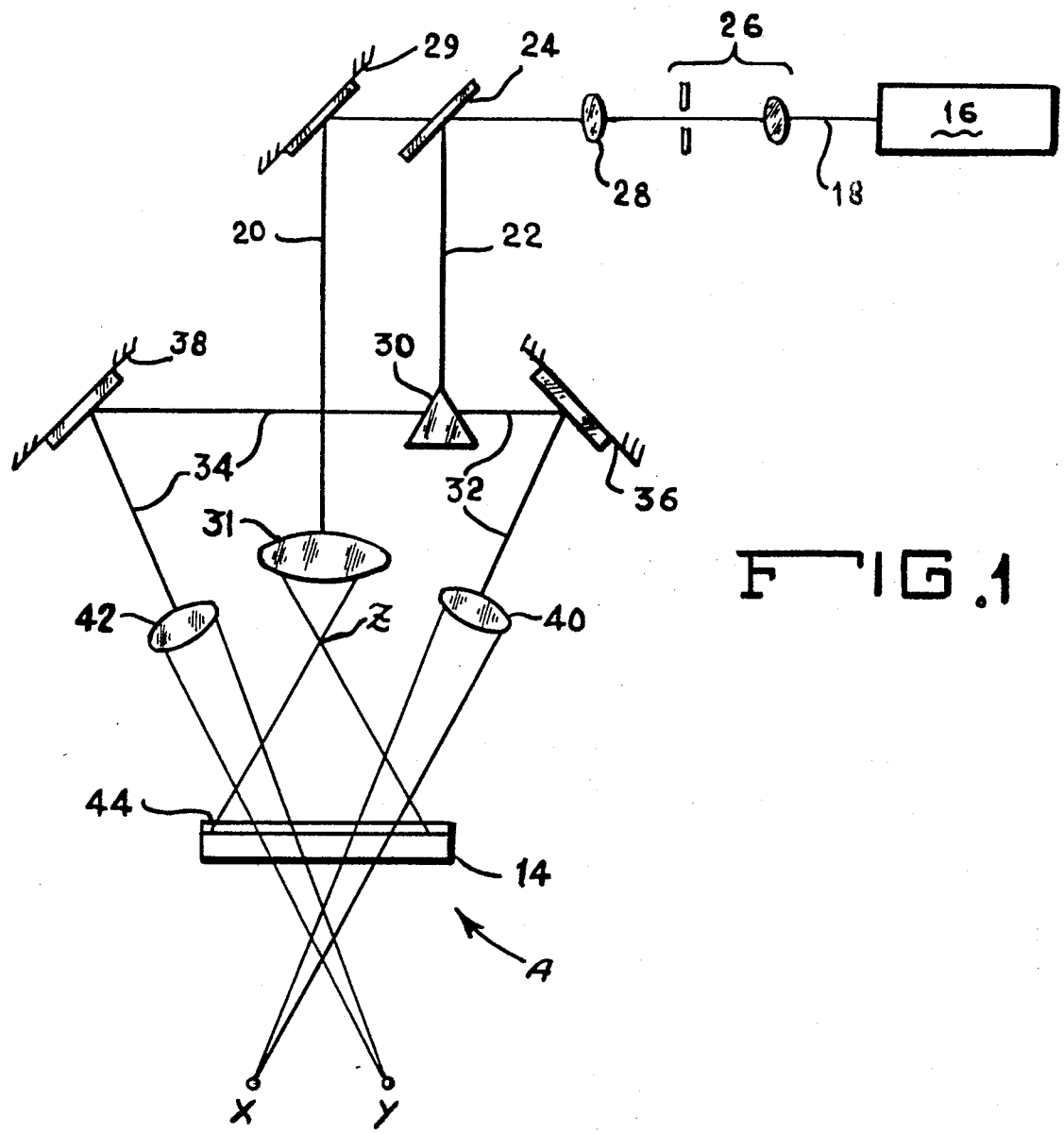
FIG. 1 is a schematic representation of the technique for producing the holographic element utilized with the transmissive directional coupler of this invention.

In order to fully understand the embodiments of this invention, it is first necessary to describe the technique for producing the holographic element utilized in the directional coupler of this invention. Since this invention is divided into two basic embodiments, FIGS. 1 and 2 will be referred to for illustrating the fabrication procedure or technique of producing the holographic element of the transmissive directional coupler 10 depicted in FIG. 3. FIG. 4 of the drawing will be referred to for illustrating the technique of producing the holographic element of the reflective directional coupler 12 depicted in FIG. 5 of the drawing. It should be noted, however, that even though the transmissive and reflective directional couplers 10 and 12, respectively, form different embodiments of this invention, the technique for producing and using both of the directional coupling devices are substantially similar. Therefore, for purposes of clarity, identical elements in all the Figures of the drawing will be referred to by the same reference numerals.

Reference is now made to FIG. 1 of the drawing in order to fully describe the technique which may be utilized to produce the holographic element A of the transmissive directional coupler 10 of this invention. This procedure incorporates therein the utilization of a photosensitive medium 14 described more fully in detail hereinbelow and any conventional source 16 of temporally and spatially coherent, monochromatic electromagentic radiation at a single wavelength. The source of electromagnetic radiation may be in the form of, for example, an argon laser, operating at a wavelength of 488.0 nanometers.

Laser 16 produces a beam 18 of electromagnetic radiation at a single wavelength. Beam 18 is divided into two portions or paths, hereinafter referred to as beams 20 and 22, by any conventional beam dividing means such as a conventional beam splitter 24. Spatial filtering and expansion of beam 18 may be accomplished by any conventional spacial filtering device, such as a lens-pinhole filter 26 while collimation of beam 18 may be achieved by any conventional collimating device such as lens 28.

Beam 20 is directed by means of mirror 29 through a lens 31 in order to produce a divergent beam on photosensitive medium 14. Lens 31 focuses beam 20 to a point Z from where it diverges and illuminates photosensitive medium 14. Beam 22 is subdivided by a conventional prismatic mirror 30 into a plurality of paths, of which, for ease of understanding of this invention only two are shown. These two beam paths, hereinafter designated as beams 32 and 34, are directed by mirrors 36 and 38, respectively, through lenses 40 and 42, respectively, which focus the beams on the opposite side of the photosensitive medium 14, at points X and Y without either overlapping each other at the photosensitive medium 14 or having any single one of the converging beams 32 or 34 completely overlapping the diverging beam 20 at the photosensitive medium 14.

Figure 2:
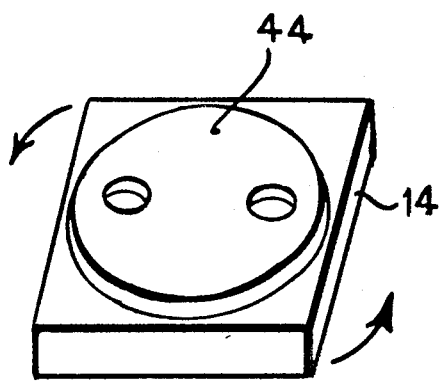
FIG. 2 is a pictorial representation of an aperture plate utilized with the manufacturing technique for producing the holographic element of the directional coupler of this invention.

FIG. 2 shows a device 44 which may be utilized with this invention for simplifying the manufacture of the holographic elements used with the directional couplers 10 and 12 when it is decided that many input/output ports (terminals) are required, or in other words, a large number of channels are desired. Each input/output port is formed by the interference of divergent beam 20, with one of the convergent beams, such as beam 32 or 34 as shown in FIG. 1. Since holographic element A of directional coupler 10 is typically on the order of a centimeter in diameter, it becomes increasingly difficult to provide more than several converging beams at once without their overlapping at the photosensitive medium 14 due to space limitations. The device 44 of FIG. 2 obviates this difficulty.

As shown in FIG. 2, device 44 is in the form of an aperture plate which is placed over photosensitive medium 14 before an exposure is made. After each exposure the photosensitive medium 14 is rotated to the next unexposed part of the medium and another exposure made. The process can be repeated, using several different sized aperture plates until photosensitive medium 14 is entirely covered, or until as many desired exposures have been made for the particular application with no converging beams overlapping each other at the photosensitive medium 14.

Still referring to FIG. 2, it is apparent that other geometries for the aperture plate of device 44 are possible. For example, an aperture plate with a single hole could be used and the unexposed photosensitive medium 44 translated in a linear fashion to produce the multiple exposures. The particular two aperture plate configuration of device 44 shown in FIG. 2 is for illustrative purposes only.

Additionally, in the method of fabricating transmissive directional coupler 10 as illustrated in FIG. 1 of the drawing, the path lengths of beams 20, 22/32 and 22/34 (although not shown exactly to scale in the drawing) are made substantially equal to each other and of such a length as to provide an interference between beams 20, 32 and 34 within photosensitive medium 14. More particularly, the difference in path lengths must be less than the so-called coherence length of laser source 10. The actual length of beam 20, beams 22/32 and beams 22/34 is defined as the length between beam splitter 24 and photosensitive medium 14. By so doing, the holographic element A for the transmissive directional coupler 10 of this invention, after subsequent photographic development in a manner more fully described below, is produced.

Still referring to FIG. 1 of the drawing, photosensitive medium 14 can be in the form of, for example, a photographic emulsion having the appropriate characteristics, a photo resist film, a dichromated geletin coating, or the like. The specific choice depends upon the properties needed for a specific application of this invention. Furthermore, photosensitive medium 14 is made of sufficient thickness to achieve a high diffraction efficiency (i.e., 80%) and yet not so thick that it will have too narrow a bandwidth of operation (i.e., ±15% about the central wavelength). The substantially identical path lengths of beams 20, 22/32 and 22/34 are achieved by the appropriate placing of suitable directing elements such as mirrors 29, 36, 38 and 30 within the path of beams 18, 22 and 24.

As a divergent beam, beam 20 illuminates the photosensitive medium 14 which is selected to have a high sensitivity at the wavelength of the coherent source of radiation 16. Divergent beam 20 illuminates photosensitive medium 14 upon which beams 32 and 34 impinge. The converging beams 32, 34 and the diverging beam 20 meet and interfere in photosensitive medium 14, which records the resultant fringe pattern typically as a refractive index or phase change in the medium. The angular relationship between beams 20, 32 and 34 should be choosen so as to lower reflection losses while at the same time obtain high dispersion. The ratio of the beam intensities would preferably be unity at the center of the pattern, although it varies by a factor of approximately two across the interference region due to the oblique angle between the beams and photosensitive medium 14. The use of substantially identical path lengths for beams 20, 22/32 and 22/34 is to insure both a high coherence between the beams and a high modulation of the interference fringes.

Photosensitive medium 14 is exposed by beams 20, 32 and 34. For example using a dichromated a gelatin film about 15 micrometers in thickness as the photosensitive medium 14, an exposure of over 100 millijoules for beam 20 would yield maximum diffraction efficiency, although it should be realized that this procedure is not limited to a particular exposure. The exposure time may also be adjusted to give the maximum possible diffraction efficiency. Subsequent development of photosensitive medium 14 produces transmissive holographic element A for use as illustrated in FIG. 3 of the drawing.

Figure 3:
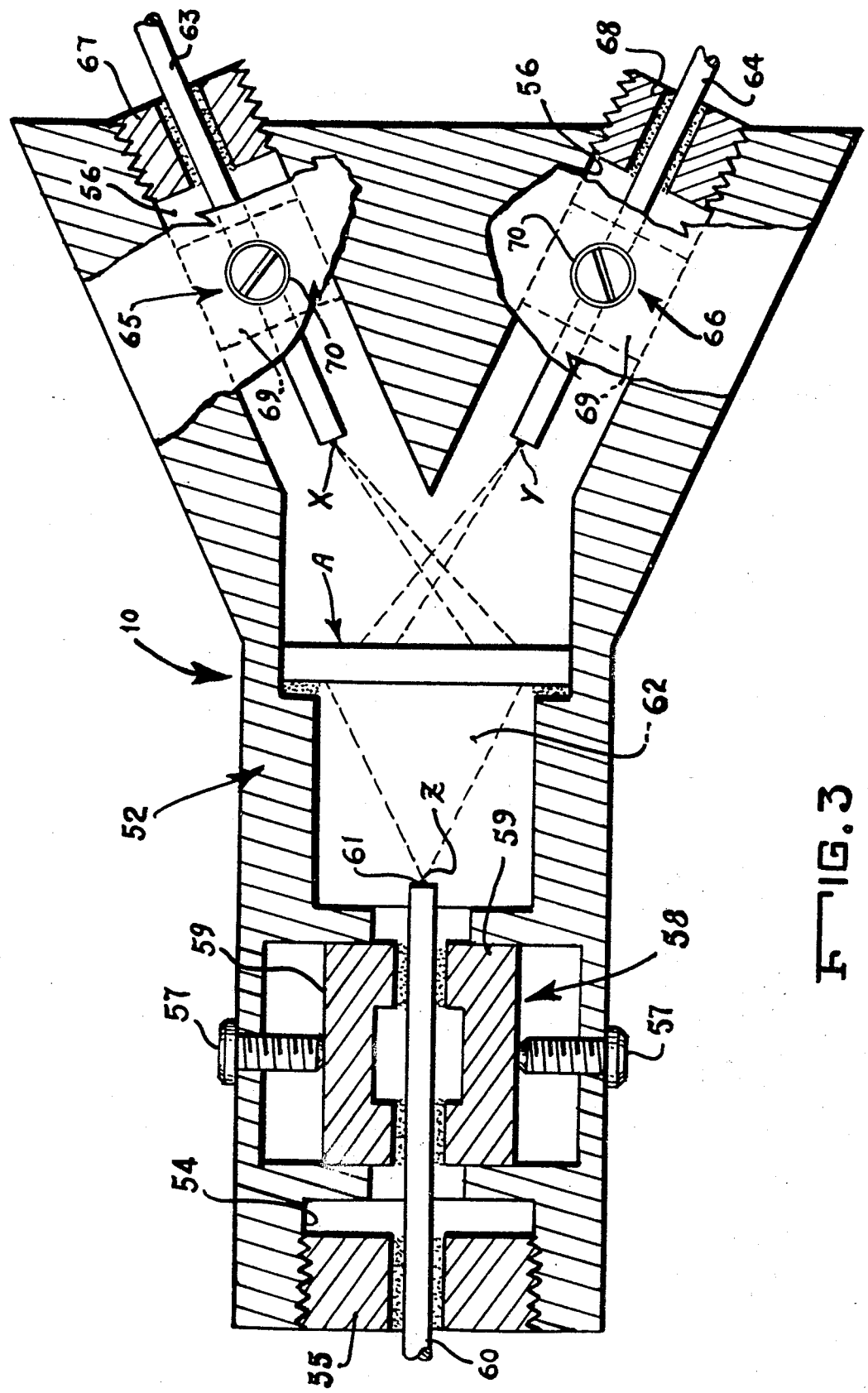
FIG. 3 is a plan view of the transmissive directional coupler of this invention shown partly in cross-section.
Figure 4:
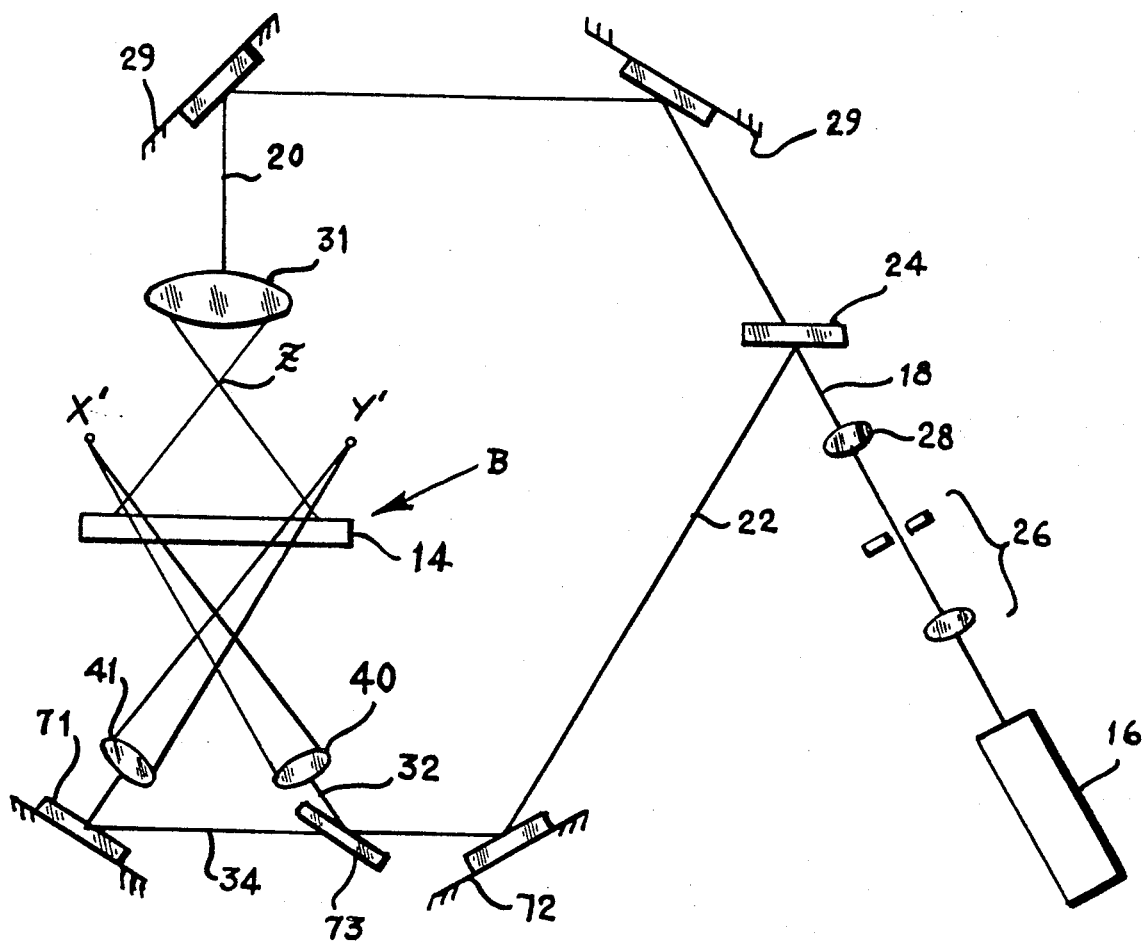
FIG. 4 is a schematic representation of a technique for producing the holographic element utilized with the reflective directional coupler of this invention.

Reference is now made to FIG. 3 of the drawing which clearly illustrates the components which make up the transmissive holographic directional coupler 10 of this invention. Transmissive directional coupler 10 is formed of a housing or fixture 52 which has a single opening 54 at one end thereof and a plurality of openings 56 at the other end thereof. For ease of understanding of the present invention only two such openings are illustrated in FIG. 3, however, it is customary that housing 52 have many such openings 56 corresponding to the number of diverging beams utilized in making holographic element A. More specifically, mounted within opening 54 is any suitable adjustable fiber mounting arrangement 58 and retainer 55 for adjustably securing in position a conventional optical fiber 60. The adjustable mounting arrangement 58, although not limited to the design shown in FIG. 3, may be made of a pair of movable clamps 59 and set screws 57.

Located adjacent an end 61 of optical fiber 60 and fixedly secured within housing 52 is the transmissive holographic element A made by the technique set forth hereinabove. Completing directional coupler 10 of this invention are a plurality of optical fibers, illustrated by two such fibers 63 and 64. Fibers 63 and 64 are mounted within housing 52 at the other end thereof within openings 56 by conventional adjustable securing assemblies 65 and 66 and retainers 67 and 68, respectively. Adjustable securing assemblies, 65 and 66 although not limited to the design shown, may each be made of a pair of movable fiber holding clamps 69 and set screws 70. Clamps 69 are identical to clamps 59, however, since they are illustrated in a plan view in FIG. 3 only one such clamp 69 of each assembly 65 and 66 is shown in dotted fashion. Retainers 67 and 68 encompass fibers 63 and 64 and threadably engage housing 52 adjacent each open end 56.

After adjustment of the position of fibers 63 and 64 in a manner described in detail below any suitable sealant may be injected between retainers 67 and 68 and fibers 63 and 64 for securely holding fibers 63 and 64 in place. It should be realized that although only two fibers 63 and 64 are shown, any number of additional fibers and open ends may be utilized with this invention, corresponding to the number of converging beams in making holographic element A.

Reference is still made to FIG. 3 of the drawing in order to describe the operation of the transmissive holographic directional coupler 10 of this invention in which holographic element A has been fabricated by the method described with respect to FIGS. 1 and 2 of the drawing. In utilizing holographic element A within coupler 10, fiber 60 is positioned so as to have its end 61 located substantially at the same spot Z relative to holographic element A as the relationship between point Z and photosensitive medium 14 utilized in the preparation of holographic element A.

Fiber 60 is coupled to a beam of electromagnetic radiation (not shown) at a single wavelength. The signal in the form of a beam 62 emerges from fiber 60. As a result of the holographic makeup of element A beam 62 is divided up into a number of different channels, focused to a different spot illustrated by two such positions X and Y in FIG. 3. Positions X and Y have the same relative position with respect to holographic element A as the points X and Y had with respect to photosensitive medium 14 described with reference to the making of holographic element A in FIG. 1. Each channel is separated and focused by holographic element A to a separate position or point. The focused spots or positions X and Y of electromagnetic radiation of each channel can be directly coupled to an individual optical fiber 63 and 64, respectively. The amount of energy transmitted (i.e., the controlled amount of energy) from fiber 60 to fibers 63 and 64 is determined by the amount of overlap between converging beams 32 and 34 and diverging beam 20 at the photosensitive medium 14 when making the holographic element in the manner set forth hereinabove.

It should also be noted that although only two such points X and Y are illustrated in the drawing, this invention is not limited to this particular number. The number of points is only used for purposes of illustration and varies in accordance with the number of channels desired. In addition, the alignment of the input fiber 60 is only critical in that it must be within a few millimeters of spot Z. It is also unnecessary to have a strictly coherent optical signal for efficient operation. Hence, power sources with limited coherence lengths can be utilized as the source of electromagnetic radiation for the holographic directional coupler 10 of this invention, such as the laser diodes typically deployed in fiber optic systems.

Although FIG. 3 of the drawing is utilized to illustrate one type of operation of this invention, it can also be utilized to depict the directional coupling operation of this invention in which all beams would be propagating in the reverse direction. That is, the individual optical channels would emerge from fibers 63 and 64, go through holographic element A and enter fiber 60 with near 100% efficiency. However, whether this device is used unidirectionally or bidirectionally, either method (illustrated in FIGS. 1 or 2), of preparing holographic element A can be utilized within the scope of this invention.

The versatility of the present invention suggests a number of diverse applications. For example, with one input and a plurality of outputs, one has the familiar "star" coupler. If directional coupler 10 of this invention is used in the bidirectional mode, one has a "master/slave" configuration, where on a time sharing mode the master channel can receive data from any of the slave channels, but the slave channels cannot eavesdrop on one another.

It is desirable in some instances to perform the coupling operation in a limited amount of space. It is therefore necessary within the scope of this invention, to fabricate the directional coupler for operation in the reflective mode. Reference is therefore made to FIG. 4 of the drawing which illustrates the procedure of this invention for producing the reflective directional coupler 12 shown in FIG. 5. It is again emphasized, that for ease of understanding this invention elements found in FIGS. 4 and 5 which are identical to the elements of FIGS. 1-3 will be given the same reference numerals. Only additional or different elements will be given different reference numerals. Further, the aperture plate of device 44 shown in FIG. 2 may be used in conjunction with the fabricating of reflective holographic element B shown in FIGS. 4 and 5.

FIG. 4 illustrates schematically an arrangement for fabricating a holographic element B utilized with the reflective directional coupler 12 of this invention. Also, to avoid obvious redundancies, since the basic procedure and concept involved in the making of the reflective coupler 12 of this invention is essentially the same as described hereinabove with reference to the fabrication of the transmissive holographic element A, a detailed explanation of similar procedures and concepts will not be repeated.

The essential difference between the procedure utilized in the fabrication of holographic element A depicted in FIG. 1 and the procedure utilized in FIG. 4 of the drawing is the relocation of reflecting and focusing elements. For example, substantially 100% reflective mirrors 71 and 72 and beamsplitter 73 are provided in order to direct beam 22 around to the back of the photosensitive medium 14 so as to impinge upon the opposite side of photosensitive medium 14 as the focus point Z of beam 20. Otherwise, the setup for the fabrication of reflective holographic element B is identical to the setup depicted in FIG. 1 for the transmissive holographic element A.

In both procedures interference within photosensitive medium 14 takes place, in which the photosensitive medium 14 records the resultant fringe pattern, for example, as a refractive index or phase change in the medium. Also, similarly to the procedure set forth with respect to FIG. 1 the path lengths of beams 20, 22/32 and 22/34 should be substantially equal. For purposes of clarity, however, the focal points of lenses 40 and 41 are designed as X' and Y'. Subsequent exposure and development of photosensitive medium 14 in order to produce reflective holographic element B shown in FIG. 5 of the drawing is accomplished in the same manner described hereinabove with respect to the fabrication of holographic element A.

Figure 5:
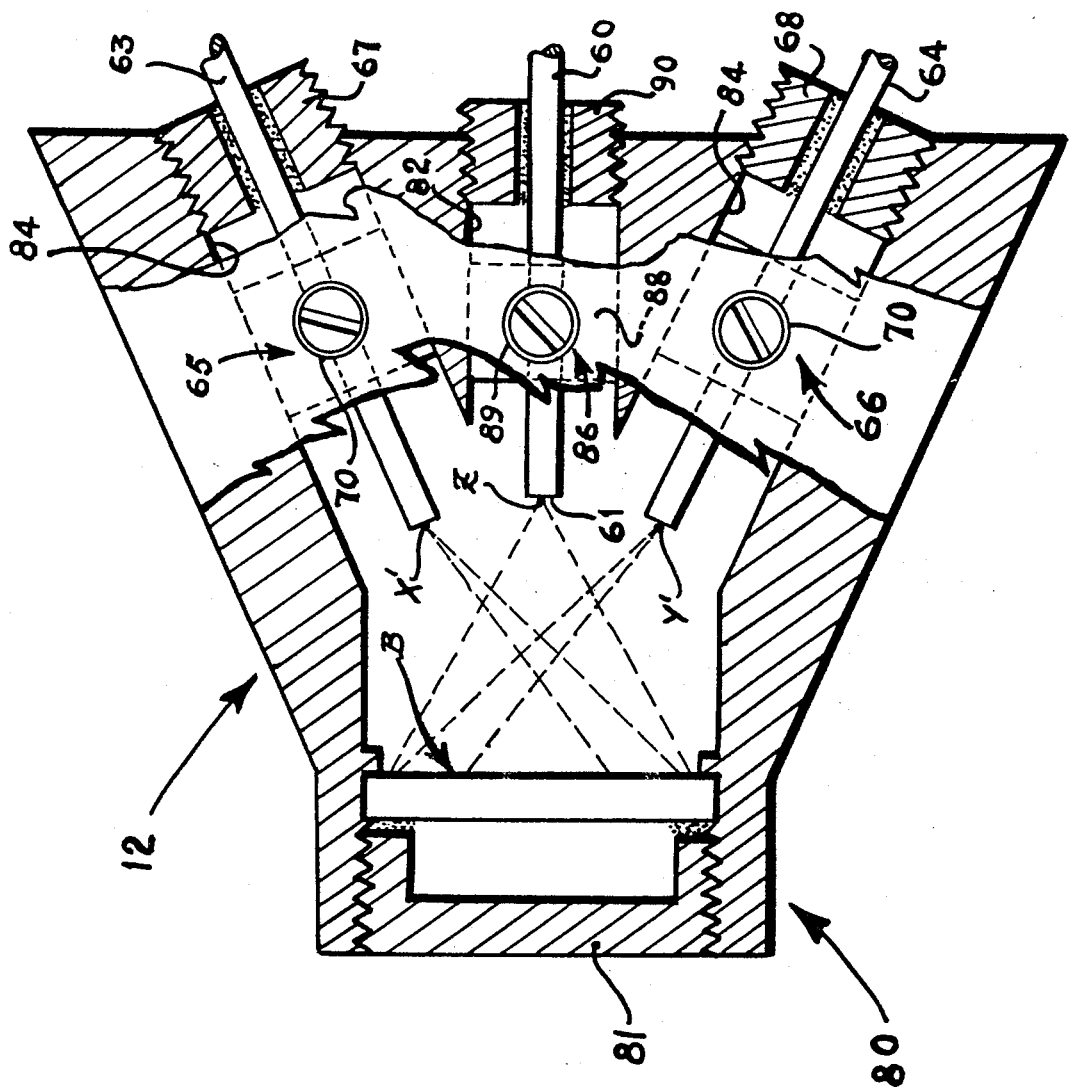
FIG. 5 is a plan view of the reflective directional coupler of this invention shown partly in cross-section.

Reference is now made to FIG. 5 of the drawing which illustrates the reflective directional coupler 12 in its operation which is virtually identical to the operation of transmissive directional coupler 10 shown in FIG. 3 of the drawing. Reflective directional coupler 12 is formed of a housing or fixture 80 which has a centrally located opening 82 and a plurality of circumferentially spaced openings 84 all positioned juxtaposed the same end of housing 80. As in the transmissive holographic directional coupler 10 illustrated in FIG. 2 of the drawing, in one of the openings 82 is located conventional optical fiber 60. A conventional adjustable mounting arrangement 86 (identical to mounting arrangement 58 shown in FIG. 3) made up of, for example, a pair of adjustable clamps 88 and set screws 89 together with retainer element 90 secures optical fiber 60 in place. Located adjacent end 61 of optical fiber 60 and fixedly secured within housing 80 by any conventional plug 81 is the reflective holographic element B. Completing holographic coupler 12 are the plurality of optical fibers 63 and 64. Fibers 63 and 64 are adjustably mounted in a manner similar to that illustrated in FIG. 3 of the drawing by means of a conventional adjustable securing assemblies 65 and 66 retainers 67 and 68, respectively.

It should be noted that in the reflective directional coupler 12 of this invention all optical fibers 60, 63 and 64 are located on the same side of holographic element B. Thereafter, adjustment of the holographic directional coupler 12 is similar to the adjustment of directional coupler 10.

As is readily apparent from FIG. 5 reflective holographic element B provides for the plurality of channels to appear on the same side of holographic element B as the input fiber 60. In other words, the end 61 of fiber 60 would be positioned at the same point Z in space as occupied by the relative position with respect to photosensitive medium 14 shown in FIG. 4. As a result of the holographic technique utilized in the manufacture of this invention, each different channel is therefore reflected from holographic element B and focused to spots X' and Y' on the same side of holographic element B as the input optical fiber 60.

The reflective coupling device 12 shown in FIG. 5 of the drawing has two major advantages over the transmissive directional coupler 10 shown in FIG. 3 of the drawing. First, it is more compact since the output beam is folded back and appears on the same side of the holographic element as the input beam. Second, one fiber bundle only need be prepared and aligned including both the input and the several output fibers.

Although this invention has been described with reference to particular embodiments, it will be understood to those skilled in the art that this invention is also capable of a variety of further embodiments within the spirit and scope of the appended claims.

We claim:

1. A holographic directional coupler for fiber optic systems comprising:

a housing, said housing having at least three openings therein, and means situated adjacent each of said openings for securing an end of an optical fiber therein;

a holographic element, said holographic element being secured within said housing in optical alignment with said ends of each of said optical fibers and wherein said holographic element separates a beam of electromagnetic radiation at a single wavelength emanating from said end of one of said optical fibers into at least two beams which are directed to and coupled into each of said ends of the other of said optical fibers with less than 100% efficiency, respectively, or combines at least two beams of electromagnetic radiation emanating from said ends of said other of said optical fibers, respectively, into a single beam which is directed to and coupled into said end of said one optical fiber with substantially 100% efficiency;

said end of said one optical fiber being situated at one preselected position with respect to said holographic element and said ends of said other optical fibers being each situated at other distinct preselected positions, respectively, with respect to said holographic element; and the relationship between said holographic element and said preselected positions of said ends of said optical fibers being substantially the same as the relationship between a photosensitive medium, the point source from which a diverging beam of spatially coherent electromagnetic radiation emerges before impinging on said photosensitive medium, and the focal points of at least two converging spatially coherent beams of electromagnetic radiation which impinge upon said photosensitive medium but do not overlap each other at the area of said impingement upon said photosensitive medium during the making of said holographic element from said photosensitive medium.

2. A holographic directional coupler for fiber optic systems as defined in claim 1 wherein all of said preselected positions of said ends of said optical fibers are located adjacent the same side of said holographic element.

3. A holographic directional coupler for fiber optic systems as defined in claim 1 wherein said one preselected position is located adjacent one side of said holographic element and said other preselected positions are located adjacent the other side of said holographic element.

4. A holographic directional coupler for fiber optic systems as defined in claim 1 wherein said optical fiber securing means are adjustably mounted within said housing.

5. A method for producing a holographic directional coupler for fiber optic systems comprising the following steps:
   (a) producing a holographic element by
      (i) providing a photosensitive medium of sufficient thickness to achieve a high diffraction efficiency of approximately 80% and a broad bandwidth of operation of approximately ±15% about a central wavelength,
      (ii) impinging a single diverging beam of temporally and spatially coherent electromagnetic radiation at a single preselected wavelength upon said photosensitive medium, said diverging beam emerging from a point source located at a preselected position with respect to said photosensitive medium,
      (iii) impinging at least two converging beams of temporally and spatially coherent electromagnetic radiation at said same single preselected wavelength upon said photosensitive medium in order to interfere with said diverging beam, each of said converging beams focusing to a different point located at a preselected position with respect to said photosensitive medium, and said converging beams not overlapping each other at said photosensitive medium, and
      (iv) processing said photosensitive medium thereby forming said holographic element;
   (b) positioning an end of an optical fiber at one preselected position adjacent said holographic element, said preselected position adjacent said holographic element having substantially the same relationship with respect to said holographic element as said point source of said diverging beam had with respect to said photosensitive medium during the production of said holographic element; and
   (c) positioning the ends of at least two other optical fibers at other preselected positions, respectively, adjacent said holographic element, each of said other preselected positions adjacent said holographic element having substantially the same relationship with respect to said holographic element as each of said focus points of said converging beams, respectively, had with respect to said photosensitive medium during the production of said holographic element.

6. A method for producing a holographic directional coupler for fiber optic systems as defined in claim 5 wherein all of said preselected positions adjacent said holographic element are located adjacent the same side of said holographic element.

7. A method for producing a holographic directional coupler for fiber optic systems as defined in claim 5 wherein said one preselected position is located adjacent one side of said holographic element and said other preselected positions are located adjacent the other side of said holographic element.

8. A method for producing a holographic directional coupler as defined in claim 5 further comprising the step of placing a plate having at least one aperture therein of preselected size over said photosensitive medium during the production of said holographic element, the location of said different focus points of said converging beams being determined by the position of said at least one aperture in said plate with respect to said photosensitive medium.

* * * * *